(12) United States Patent
Thomas

(10) Patent No.: US 11,103,103 B2
(45) Date of Patent: Aug. 31, 2021

(54) COLD BREWED COFFEE SYSTEM IN A REFRIGERATOR APPLIANCE

(71) Applicant: Haier US Appliance Solutions, Inc., Wilmington, DE (US)

(72) Inventor: Ryan Joseph Thomas, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 374 days.

(21) Appl. No.: 16/139,132

(22) Filed: Sep. 24, 2018

(65) Prior Publication Data
US 2020/0093320 A1 Mar. 26, 2020

(51) Int. Cl.
*A47J 31/44* (2006.01)
*F25D 23/12* (2006.01)
*A47J 31/52* (2006.01)
*A47J 31/46* (2006.01)

(52) U.S. Cl.
CPC ......... *A47J 31/525* (2018.08); *A47J 31/4403* (2013.01); *A47J 31/467* (2013.01); *F25D 23/126* (2013.01)

(58) Field of Classification Search
CPC ... F25D 23/126; A47J 31/525; A47J 31/4403; A47J 31/467; A47J 31/462
See application file for complete search history.

(56) References Cited

U.S. PATENT DOCUMENTS

| | | | | |
|---|---|---|---|---|
| 5,724,883 | A | * | 3/1998 | Usherovich ........... A47J 31/057 426/433 |
| 6,118,933 | A | * | 9/2000 | Roberson ................ A47J 31/41 222/146.5 |
| 7,610,849 | B2 | * | 11/2009 | Bigge ..................... A47J 31/36 62/390 |
| 8,596,087 | B2 | * | 12/2013 | Park ...................... F25D 23/126 62/389 |
| 9,357,874 | B2 | * | 6/2016 | Licare ................. A47J 31/4403 |
| 9,961,917 | B2 | | 5/2018 | Van Schyndel et al. |
| 2001/0012448 | A1 | * | 8/2001 | Roberson ................ A47J 31/56 392/442 |

(Continued)

FOREIGN PATENT DOCUMENTS

DE 102008052273 A1 4/2010
KR 200192381 8/2000
(Continued)

*Primary Examiner* — Robert J Utama
*Assistant Examiner* — Lawrence H Samuels
(74) *Attorney, Agent, or Firm* — Dority & Manning, P.A.

(57) ABSTRACT

A refrigerator appliance having a cold brewed coffee system positioned within a chilled chamber of the refrigerator appliance is provided. In one example aspect, the system includes a housing defining a water reservoir and a coffee reservoir. The water reservoir is in fluid communication with a water supply via an inlet supply conduit. An inlet valve is positioned along the inlet supply conduit and selectively allows water into the water reservoir. The water within the water reservoir drips into the coffee reservoir where the water mixes with coffee materials received therein. Cold brewed coffee is produced within the coffee reservoir and may slowly drip into a coffee container positioned or docked beneath the housing.

17 Claims, 11 Drawing Sheets

(56) References Cited

U.S. PATENT DOCUMENTS

| | | | | |
|---|---|---|---|---|
| 2003/0066431 A1* | 4/2003 | Fanzutti | A47J 31/469 | 99/279 |
| 2007/0209522 A1* | 9/2007 | Bigge | F25D 23/12 | 99/279 |
| 2008/0302822 A1* | 12/2008 | Tetreault | F25D 3/08 | 222/146.6 |
| 2009/0317526 A1* | 12/2009 | Tacklind | A47J 31/0615 | 426/433 |
| 2010/0175416 A1* | 7/2010 | Park | F25D 23/126 | 62/389 |
| 2012/0102993 A1* | 5/2012 | Hortin | B67D 1/0888 | 62/189 |
| 2012/0103000 A1* | 5/2012 | Krause | F25D 23/126 | 62/389 |
| 2012/0103001 A1* | 5/2012 | Krause | F25D 23/126 | 62/389 |
| 2014/0299000 A1* | 10/2014 | Hanneson | A47J 31/369 | 99/300 |
| 2015/0060491 A1* | 3/2015 | Bird | A47J 31/465 | 222/146.6 |
| 2015/0157168 A1* | 6/2015 | Burrows | A47J 31/462 | 426/231 |
| 2016/0073819 A1* | 3/2016 | Licare | A47J 31/462 | 426/425 |
| 2016/0183714 A1* | 6/2016 | Hwang | A47J 31/4403 | 99/285 |
| 2017/0211872 A1* | 7/2017 | Goerz | B67D 1/0881 | |
| 2017/0303736 A1* | 10/2017 | Eccker | A47J 31/56 | |
| 2017/0319005 A1* | 11/2017 | Freedman | A47J 31/002 | |
| 2018/0168388 A1* | 6/2018 | Kim | A47J 31/4475 | |
| 2019/0282026 A1* | 9/2019 | Huang | A23F 3/18 | |
| 2020/0315397 A1* | 10/2020 | Park | A47J 31/461 | |

FOREIGN PATENT DOCUMENTS

| | | |
|---|---|---|
| KR | 200469626 Y1 | 10/2013 |
| WO | WO2016186384 A1 | 11/2016 |

* cited by examiner

COLD BREWED COFFEE SYSTEM IN A REFRIGERATOR APPLIANCE

FIELD OF THE INVENTION

The present subject matter relates generally to refrigerator appliances, and more particularly to cold brewed coffee systems for refrigerator appliances.

BACKGROUND OF THE INVENTION

Generally, consumers have few options for cold brewing coffee systems. Many of the cold brewing coffee systems available are manufactured as dedicated units that may be placed on a kitchen countertop. Such units require constant manual water refilling and take up valuable countertop space. Moreover, in some instances, users prefer that their coffee grounds be steeped in relatively cold water. Many conventional cold brewed coffee systems do not have a means for cooling or maintaining the cold temperature of the water. Thus, the coffee grounds are not steeped in cold water as desired. This may produce unsatisfactory coffee. Further, after the coffee is brewed by such conventional systems, the produced coffee may be relatively warm (e.g., room temperature) and not chilled as desired. Thus, to chill the produced coffee to the desired temperature, a user is required to transport the brewed coffee to a chilled chamber. This may be an inconvenience to users.

Accordingly, a cold brewed coffee system that addresses one or more of the challenges noted above would be desirable.

BRIEF DESCRIPTION OF THE INVENTION

Aspects and advantages of the invention will be set forth in part in the following description, or may be apparent from the description, or may be learned through practice of the invention.

In one exemplary embodiment, a refrigerator appliance is provided. The refrigerator appliance includes a cabinet defining a chilled chamber. The refrigerator appliance also includes a cold brewed coffee system positioned within the chilled chamber. The cold brewed coffee system includes a housing defining a water reservoir and a coffee reservoir in fluid communication with the water reservoir, the coffee reservoir configured to receive coffee materials for mixing with water flowing downstream from the water reservoir to produce cold brewed coffee. Further, the cold brewed coffee system includes a water level sensing system operable to detect when water within the water reservoir has reached a predetermined water level. In addition, the cold brewed coffee system includes an inlet supply conduit fluidly connecting a water supply with the water reservoir. Moreover, the cold brewed coffee system includes an inlet valve positioned along the inlet supply conduit and movable between an open position and a closed position, the inlet valve configured for selectively allowing water to flow from the water supply to the water reservoir.

In another exemplary embodiment, a refrigerator appliance defining a vertical direction is provided. The refrigerator appliance includes a cabinet defining a fresh food chamber. The refrigerator appliance also includes a cold brewed coffee system positioned within the fresh food chamber. The cold brewed coffee system includes a housing defining a water reservoir and a coffee reservoir positioned below the water reservoir along the vertical direction, the water reservoir in fluid communication with the water reservoir via a drip passage defined by the housing, the coffee reservoir configured to receive coffee materials. In addition, the cold brewed coffee system includes a water level sensing system operable to detect when water within the water reservoir has reached a predetermined water level. The cold brewed coffee system further includes an inlet supply conduit fluidly connecting a water supply with the water reservoir. The cold brewed coffee system also includes an inlet valve positioned along the inlet supply conduit and movable between an open position and a closed position, the inlet valve configured for selectively allowing water to flow from the water supply to the water reservoir. Further, the cold brewed coffee system includes a controller communicatively coupled with the water level sensing system. The controller is configured to: receive one or more signals indicating that a user input has been provided to commence a cold brewing process utilizing the cold brewed coffee system; control the inlet valve to move to the open position so that water flows flow from the water supply to the water reservoir; receive, from the water level sensing system, one or more signals indicating whether water within the water reservoir has reached a predetermined water level; and control the inlet valve to move to the closed position if water within the water reservoir has reached the predetermined water level, and wherein water flows from the water reservoir to the coffee reservoir through the drip passage and mixes with the coffee materials to produce cold brewed coffee.

In yet another exemplary embodiment, a refrigerator appliance is provided. The refrigerator appliance includes a cabinet defining a chilled chamber. The refrigerator appliance also includes a cold brewed coffee system positioned within the chilled chamber. The cold brewed coffee system includes a housing defining a reservoir, the reservoir configured to receive coffee materials for mixing with water to produce cold brewed coffee. Further, the cold brewed coffee system includes a water level sensing system operable to detect when water within the reservoir has reached a predetermined water level. Also, the cold brewed coffee system includes an inlet supply conduit fluidly connecting a water supply with the reservoir. In addition, the cold brewed coffee system includes an inlet valve positioned along the inlet supply conduit and movable between an open position and a closed position, the inlet valve configured for selectively allowing water to flow from the water supply to the reservoir.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
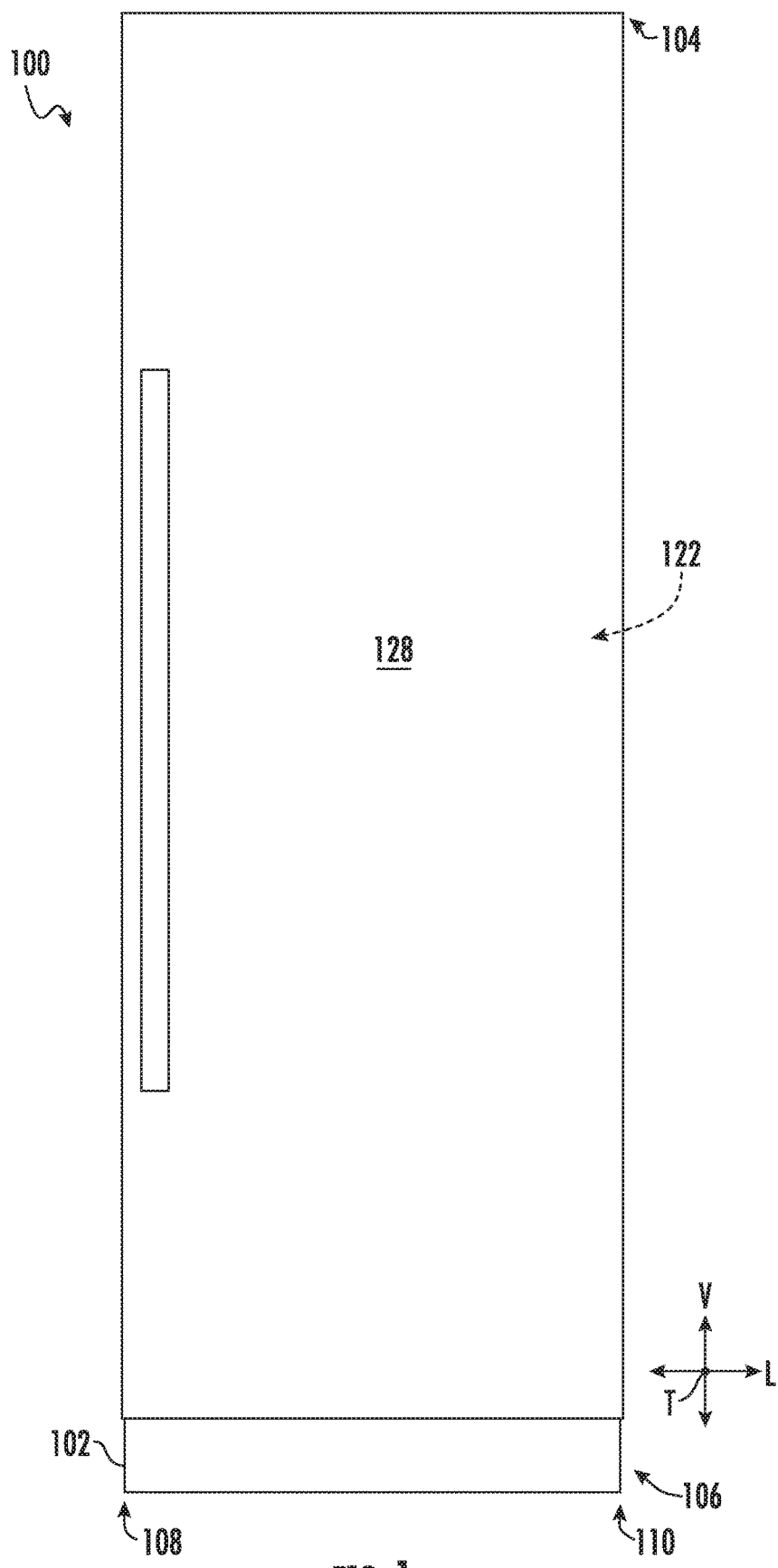
FIG. 1 provides a front view of an exemplary refrigerator appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents. As used herein, terms of approximation, such as "approximately," "substantially," or "about," refer to being within a ten percent (10%) margin of error of the stated value. Moreover, as used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

FIG. 1 provides a front view of a refrigerator appliance 100 according to an exemplary embodiment of the present subject matter. For this embodiment, refrigerator appliance 100 is a built-in or column refrigerator appliance configured to be built into a wall or cabinetry. However, the inventive aspects of the present disclosure apply to other types and styles of refrigerator appliances, such as e.g., bottom mount refrigerator appliances, top mount refrigerator appliances, side-by-side refrigerator appliances, etc. Consequently, the description set forth herein is for illustrative purposes only and is not intended to be limiting in any aspect to any particular refrigerator appliance type or configuration.

Refrigerator appliance 100 includes a cabinet or housing 102 that extends between a top 104 and a bottom 106 along a vertical direction V, between a first side 108 and a second side 110 along a lateral direction L, and between a front side and a rear side along a transverse direction T (a direction extending into and out of the page in FIG. 1). Each of the vertical direction V, lateral direction L, and transverse direction T are mutually perpendicular to one another and form an orthogonal direction system. Housing 102 defines a chilled chamber for receipt of food items for storage. In particular, housing 102 defines a fresh food chamber 122. Thus, column refrigerator appliance 100 is a single purpose unit in this example embodiment. Refrigerator door 128 is rotatably mounted to an edge of housing 102 for selectively accessing fresh food chamber 122. Refrigerator door 128 is shown in the closed configuration in FIG. 1. One skilled in the art will appreciate that other chamber and door configurations are possible and within the scope of the present invention.

Figure 2:
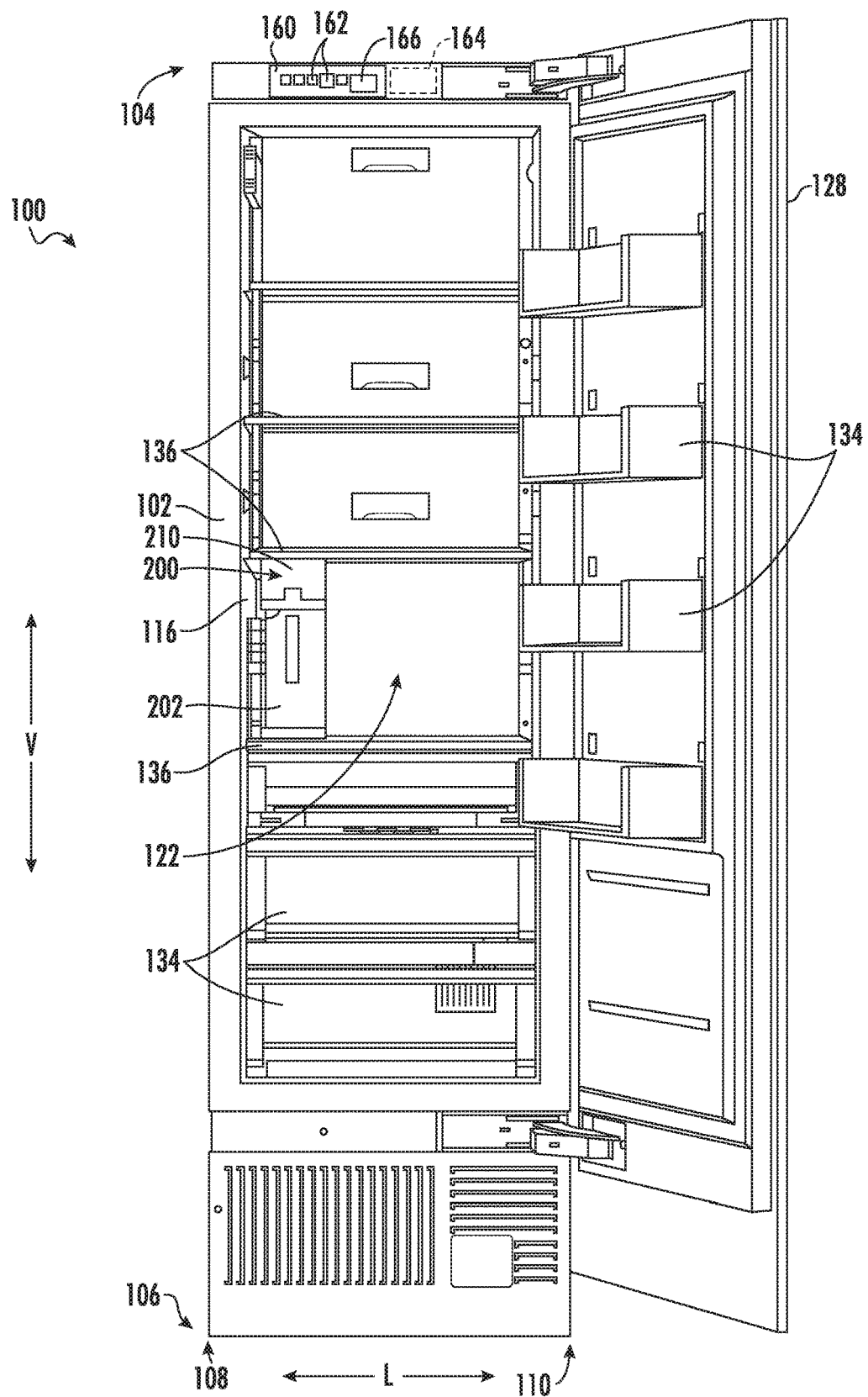
FIG. 2 provides a front view of the refrigerator appliance of FIG. 1 and depicts a refrigerator door of the refrigerator appliance in an open position.

FIG. 2 provides a front view of refrigerator appliance 100 shown with refrigerator door 128 in the open position. As shown in FIG. 2, various storage components are mounted within fresh food chamber 122 to facilitate storage of food items therein as will be understood by those skilled in the art. In particular, the storage components may include bins 134 and shelves 136. Each of these storage components are configured for receipt of food items (e.g., beverages and/or solid food items) and may assist with organizing such food items. As illustrated, bins 134 may be mounted on refrigerator door 128 or may slide into a receiving space in fresh food chamber 122. It should be appreciated that the illustrated storage components are used only for the purpose of explanation and that other storage components may be used and may have different sizes, shapes, and configurations.

Refrigerator appliance 100 includes a control panel 160. Control panel 160 includes one or more input selectors 162, such as e.g., knobs, buttons, push buttons, touchscreen interfaces, etc. In addition, input selectors 162 may be used to specify or set various settings of refrigerator appliance 100, such as e.g., settings associated with a cold brewed coffee system as will be explained further below. Input selectors 162 may be in communication with a processing device or controller 164. Control signals generated in or by controller 164 operate refrigerator appliance 100 in response to input selectors 162. Additionally, control panel 160 may include a display 166, such as an indicator light or a screen. Display 166 is communicatively coupled with controller 164 and may display information in response to signals from controller 164. Further, as will be described herein, controller 164 may be communicatively coupled with other components of refrigerator appliance 100, such as e.g., one or more sensors and components of a cold brewed coffee system.

As used herein, "processing device" or "controller" may refer to one or more microprocessors or semiconductor devices and is not restricted necessarily to a single element. The processing device can be programmed to operate refrigerator appliance 100. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations.

As further shown in FIG. 2, refrigerator appliance 100 includes a cold brewed coffee system 200 disposed within fresh food chamber 122. Generally, cold brewed coffee system 200 is configured to cold brew coffee and dispense the brewed coffee into a container 202 docked with or positioned below system 200 along the vertical direction V. As shown, a housing 210 of cold brewed coffee system 200 is mounted within fresh food chamber 122. For instance, cold brewed coffee system 200 may be mounted to a bottom of one of shelves 136 or may be mounted to another suitable structure, such as e.g., a liner 116 of refrigerator appliance 100 as shown in FIG. 2. A user may place or dock container 202 beneath housing 210 and cold brewed coffee may drip or be dispensed into container 202. Thus, consumers may have ready access to cold brewed coffee provided by cold brewed coffee system 200. Cold brewed coffee system 200 will be explained in detail below.

Figure 3:
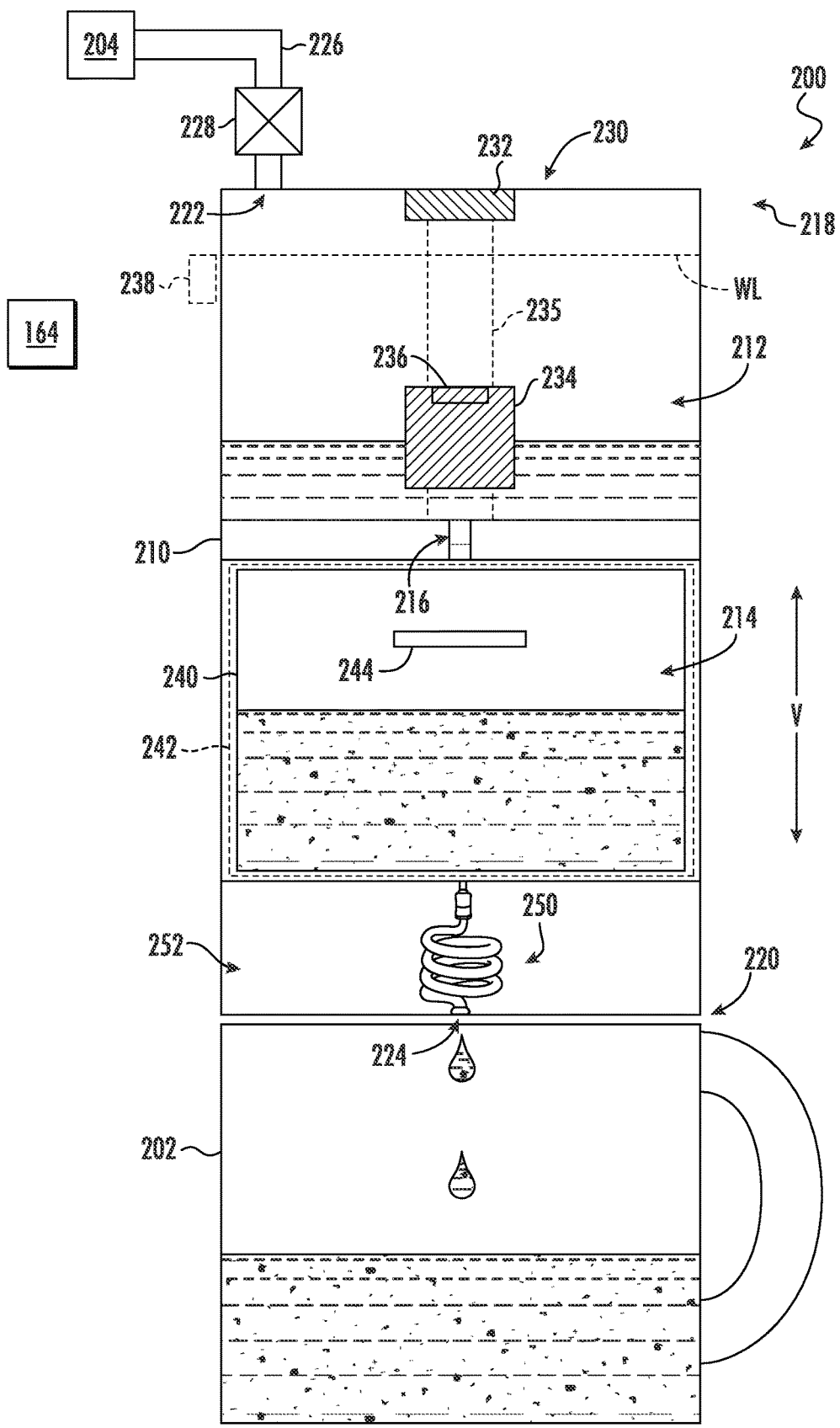
FIG. 3 provides a schematic view of an exemplary cold brewed coffee system of the refrigerator appliance of FIGS. 1 and 2.

FIG. 3 provides a schematic view of cold brewed coffee system 200 of refrigerator appliance 100 of FIGS. 1 and 2. As shown in FIG. 3, cold brewed coffee system 200 includes housing 210, as noted above. Housing 210 defines a water reservoir 212 and a coffee reservoir 214 in fluid communication with water reservoir 212. Coffee reservoir 214 is positioned below water reservoir 212 along the vertical direction V as shown in FIG. 3. A drip passage 216 fluidly connects water reservoir 212 and coffee reservoir 214. Drip passage 216 is sized so that water drips from water reservoir 212 into coffee reservoir 214. Generally, water reservoir 212 is configured to receive water and coffee reservoir 214 is configured to receive coffee grounds and water from water reservoir 212, e.g., for cold brewing the coffee grounds.

Housing 210 of cold brewed coffee system 200 extends between a top end 218 and a bottom end 220, e.g., along the vertical direction V. For this embodiment, housing 210 defines an inlet 222 at top end 218 and an outlet 224 at bottom end 220. Cold brewed coffee system 200 includes an inlet supply conduit 226 that fluidly connects a water supply 204 with water reservoir 212. More particularly, inlet supply conduit 226 fluidly connects water supply 204 with inlet 222 of housing 210 so that water may flow from water supply 204 to water reservoir 212. An inlet valve 228 is positioned along inlet supply conduit 226. Inlet valve 228 is movable between an open position and a closed position. Thus, inlet valve 228 is configured for selectively allowing water to flow from water supply 204 to water reservoir 212. In the open position, inlet valve 228 allows water to flow from water supply 204 to water reservoir 212. In the closed position, inlet valve 228 prevents water from flowing from water supply 204 to water reservoir 212.

In some embodiments, inlet valve 228 is a normally closed solenoid valve. Controller 164 or another processing device dedicated to cold brewed coffee system 200 is communicatively coupled with inlet valve 228. For instance, upon initiation of a cold brewing process by a user input, e.g., to one of input selectors 162 (FIG. 2), controller 164 may control inlet valve 228 to move to the open position so that water may flow from water supply 204 to water reservoir 212. For instance, controller 164 may send an activation signal to energize inlet valve 228 so that inlet valve 228 moves to the open position. When water within water reservoir 212 has reached a predetermined water level (e.g., as determined by a water level sensing system), controller 164 may control inlet valve 228 to move to the closed position.

Cold brewed coffee system 200 also includes a water level sensing system 230 operable to detect when water within the water reservoir has reached a predetermined water level, denoted by WL in FIG. 3. For the depicted embodiment of FIG. 3, water level sensing system 230 includes a float 234 and a reed switch 232. Float 234 is buoyant and is configured to float to the surface of the water within water reservoir 212. Float 234 may be attached or connected to a track 235 so that float 234 moves generally up and down with the water line along the vertical direction V. A magnet 236 is attached to or embedded within float 234. Reed switch 232 is attached or connected to a top wall of housing 210 at top end 218 and is positioned within water reservoir 212. In some embodiments, reed switch may be positioned outside of or above water reservoir 212. Reed switch 232 is communicatively coupled with inlet valve 228. In some embodiments, reed switch 232 is directly communicatively coupled with inlet valve 228 (e.g., via a wired or wireless connection). For this embodiment, reed switch 232 is communicatively coupled with inlet valve 228 via controller 164 and one or more wired or wireless connections. When the water level within water reservoir 212 reaches the predetermined water level WL, float 234 floats to the top of water reservoir 212 (see e.g., FIG. 7) and activates reed switch 232. That is, when float 234 is positioned at or proximate reed switch 232, magnet 236 of float 234 activates reed switch 232. When reed switch 232 is activated, a signal indicating that the water level within water reservoir 212 has reached the predetermined water level WL is sent to controller 164 and controller 164 receives and processes the signal. Thereafter, controller 164 may control inlet valve 228 to the closed position, e.g., to shut off the flow of water from water supply 204 to water reservoir 212. Thus, when float 234 is positioned at or proximate reed switch 232, magnet 236 of float 234 activates reed switch 232 causing inlet valve 228 to move to the closed position. In some embodiments, as noted above, reed switch 232 is directly communicatively coupled with inlet valve 228 and thus one or more signals may be routed directly to inlet valve 228.

In some alternative embodiments, water level sensing system 230 includes a water level sensor 238 (shown in phantom in FIG. 3). In such embodiments, water level sensor 238 is configured to detect the water level of the water within water reservoir 212. For instance, water level sensor 238 may be mounted to housing 210 such that water level sensor 238 may detect when the water within water reservoir 212 has reached the predetermined water level WL. Water level sensor 238 may be any suitable type of sensor capable of sensing the water level of the water within water reservoir 212. As one example, water level sensor 238 may be an infrared sensor. Water level sensor 238 is communicatively coupled with controller 164, e.g., so that one or more signals may be routed therebetween. In some embodiments, water level sensor 238 is directly communicatively coupled with inlet valve 228 (e.g., via a wired or wireless connection).

As further depicted in FIG. 3, housing 210 of cold brewed coffee system 200 has an access panel 240 that provides selective access to coffee reservoir 214. For instance, access panel 240 may be rotatably coupled or hinged with housing 210 and may be movable between an open position and a closed position. Access panel 240 may be rotated to the open position so that coffee materials (e.g., coffee grounds and a filter) are loadable into coffee reservoir 214. Access panel 240 may include a handle 244 to facilitate movement of access panel 240 between the open and closed positions. Once the coffee grounds and filter are loaded, the user may rotate access panel 240 to the closed position and sealed. In some embodiments, access panel 240 extends the full vertical length of coffee reservoir 214 as shown in FIG. 3. In other embodiments, access panel 240 need not extend the full vertical length of coffee reservoir 214. For instance, access panel 240 may extend half the vertical length of coffee reservoir 214.

In some alternative embodiments, instead of access panel 240, housing 210 has a bin 242 (represented in phantom in FIG. 3) movable between a withdrawn position and a retracted position. Bin 242 may include handle 244 that may be utilized by a user to move bin 242 between the withdrawn position in which coffee materials (e.g., coffee grounds and a filter) are loadable into bin 242 and the retracted position in which bin 242 is housed within housing 210, e.g., during operation of cold brewed coffee system 200. In such embodiments, bin 242 and housing 210 define coffee reservoir 214.

A slow drip passage 250 fluidly connects coffee reservoir 214 with outlet 224 of housing 210. Slow drip passage 250 is positioned generally below coffee reservoir 214 along the vertical direction V. For this embodiment, slow drip passage 250 is positioned within a slow drip chamber 252 defined by housing 210 vertically below coffee reservoir 214. Slow drip passage 250 facilitates a slow drip of the coffee produced in coffee reservoir 214 into coffee container 202. For the embodiment depicted in FIG. 3, slow drip passage 250 is a spiral coil. However, in other exemplary embodiments, slow drip passage 250 may have other suitable geometries that facilitate the slow drip of coffee from coffee reservoir 214 into coffee container 202 docked below cold brewed coffee system 200. In yet other embodiments, a valve may be positioned to control the slow drip. For instance, controller 164 may control the valve to ultimately control the slow drip of coffee into coffee container 202. Notably, as cold brewed coffee system 200 is positioned within fresh food chamber 122 of refrigerator appliance 100 (FIG. 2), the produced coffee that has dripped into container 202 is maintained at a chilled temperature and is thus instantly ready for consumer consumption at the chilled temperature.

Figure 4:
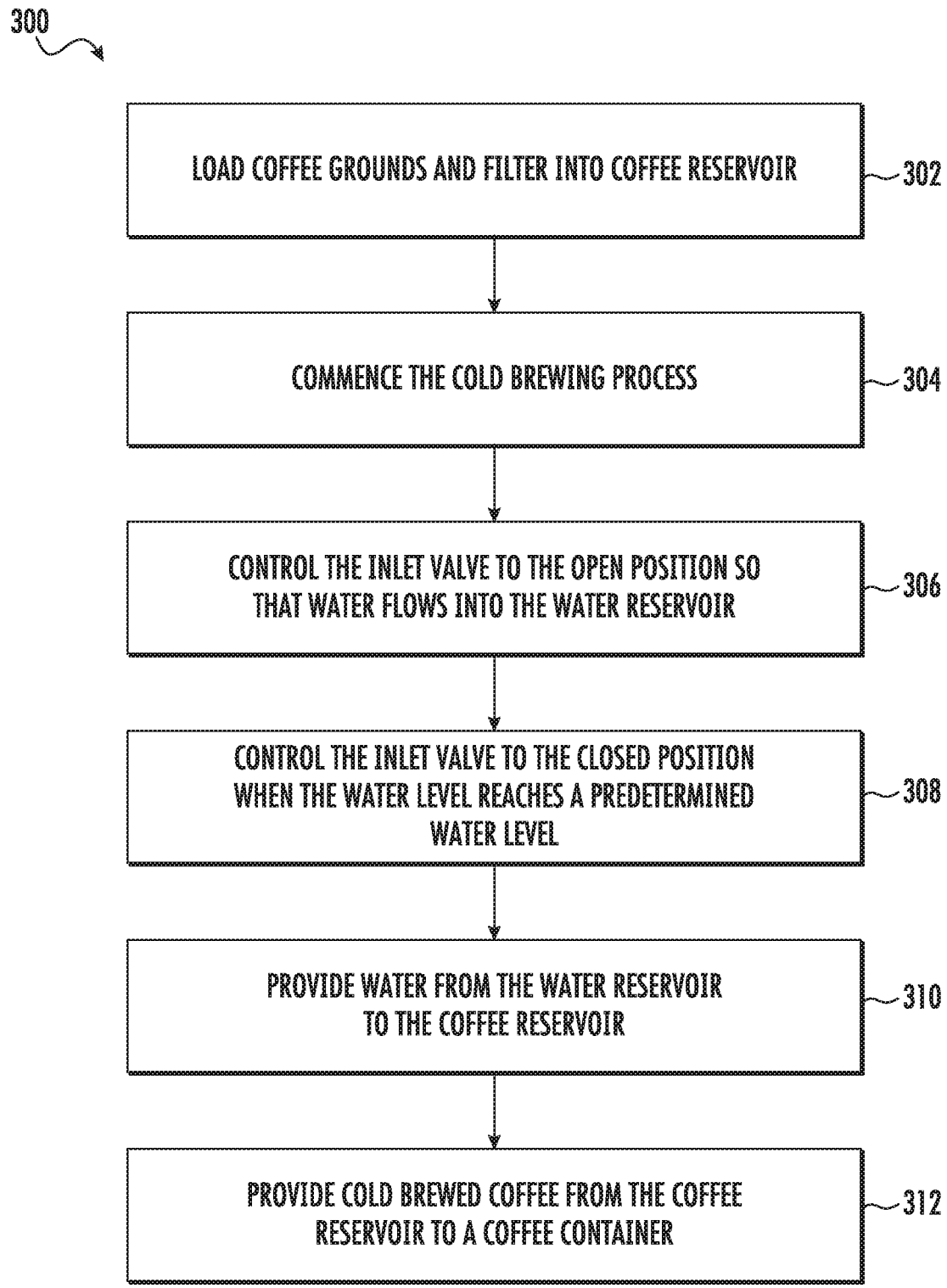
FIG. 4 provides a flow diagram of an exemplary method for cold brewing coffee utilizing the cold brewed coffee system of FIG. 3.

FIG. 4 provides a flow diagram of an exemplary method (300) for cold brewing coffee utilizing cold brewed coffee system 200 of FIG. 3. FIGS. 5, 6, 7, 8, 9, and 10 provide various schematic views of cold brewed coffee system 200 depicting various stages of the cold brewing process. The exemplary cold brewing process described below provides one exemplary manner in which cold brewed coffee system 200 may cold brew coffee, however, the description below is not intended to be limiting.

Figure 5:
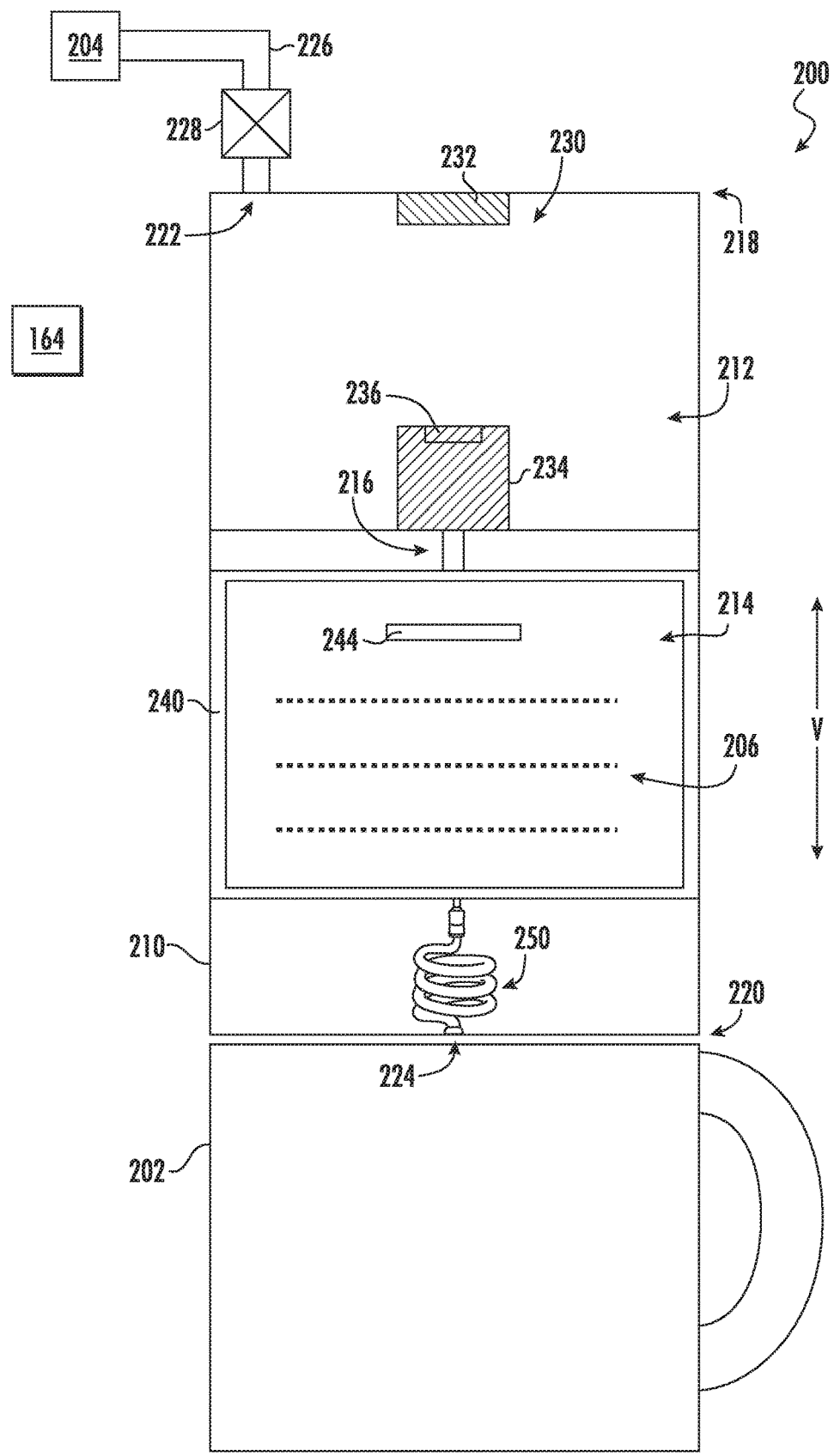
FIGS. 5 through 10 provide schematic views of the cold brewed system of FIG. 3 and depict and exemplary cold brewing process according to an exemplary embodiment of the present subject matter.

At (302), method (300) includes loading coffee materials into coffee reservoir 214. For instance, a user may load coffee materials into coffee reservoir 214 in the following exemplary manner. A user may access the chilled chamber or fresh food chamber 122 of refrigerator appliance 100 by opening refrigerator door 128 (FIG. 2). A user may then access coffee reservoir 214 by rotating access panel 240 to the open position. Once access panel 240 is in the open position, the user may load coffee materials into coffee reservoir 214. Coffee materials may include, for example, coffee grounds and a filter. In FIG. 5, coffee materials 206 are shown loaded into coffee reservoir 214 (access panel 240 is formed of a transparent material (e.g., glass) in FIG. 5). Once the coffee materials 206 are loaded into coffee reservoir 214, a user may rotate access panel 240 to the closed position such that access panel 240 may be sealed with housing 210

In some alternative implementations, instead of access panel 240, housing 210 of cold brewed coffee system 200 includes bin 242 (represented in phantom in FIG. 3). In such implementations, a user may access fresh food chamber 122 of refrigerator appliance 100 by opening refrigerator door 128 (FIG. 2) in the same manner as noted above. Thereafter, a user may load coffee materials 206 into bin 242 by moving bin 242 to the withdrawn position (e.g., by pulling on handle 244 of bin 242) and placing the coffee materials 206 into bin 242. Once the coffee materials 206 are loaded into bin 242, the user may move bin 242 to the retracted position (e.g., by pushing bin 242). Accordingly, operation of cold brewed coffee system 200 is ready to commence.

At (304), with reference again to FIG. 4, the method (300) includes commencing the cold brewing process. For instance, a user may commence the cold brewing process in the following exemplary manner. A user may commence the cold brewing process by providing a user input. For example, a user may provide a user input to one of the input selectors 162 of control panel 160 (FIG. 2). The input selector 162 may be a "Start" push button, for example. As another example, the user may provide a user input to a dedicated button (not shown) located on housing 210. The dedicated button may likewise be a "Start" button. As yet another example, the user may provide a user input to a remote electronic user device (e.g., a smart phone) that is communicatively coupled with controller 164 of cold brewed coffee system 200. As another example, the user may provide a voice command to commence the cold brewing process. Controller 164 may receive one or more signals indicating that a user input has been provided to commence the cold brewing process.

At (306), the method (300) includes controlling the inlet valve to the open position so that water flows from the water supply to the water reservoir. For instance, controller 164 may control inlet valve 228 to move to the open position so that water may flow from water supply 204 downstream to water reservoir 212. As one example, inlet valve 228 may be a normally closed solenoid valve. To control inlet valve 228 to the open position, controller 164 may send one or more activation signals to energize solenoid inlet valve 228 such that the valve moves to the open position. When inlet valve 228 is moved to the open position, water flows from water supply 204, through inlet valve 228, and into water reservoir 212 through inlet 222. Water may flow into water reservoir 212 until the water reaches a predetermined water level WL as will be explained further below.

Figure 6:
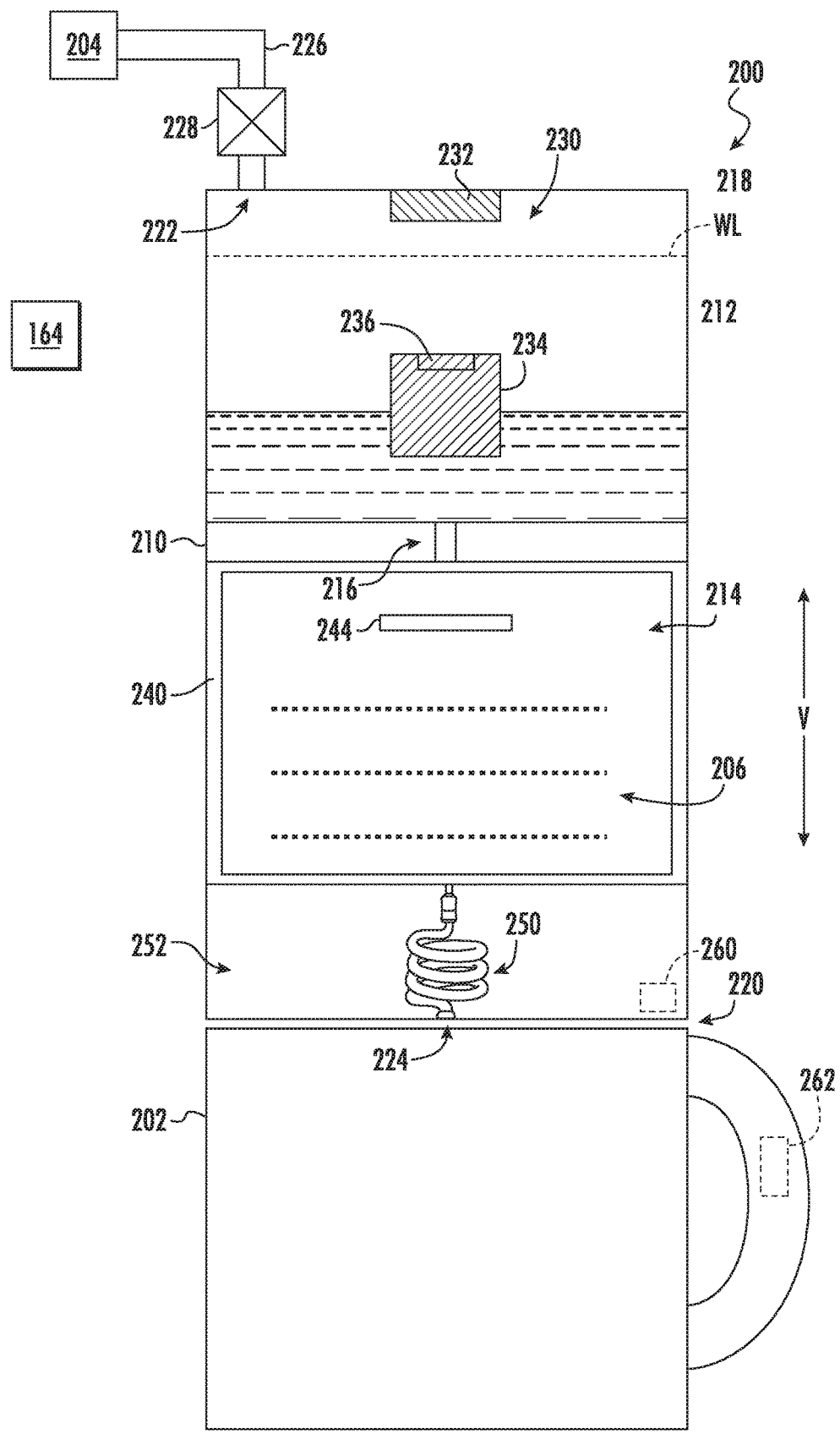

In some implementations, as shown in FIG. 6, cold brewed coffee system 200 includes a proximity sensor 260 embedded with, attached, or connected to housing 210 and coffee container 202 includes a proximity element 262. Proximity sensor 260 can be a magnetoresistance sensor and proximity element 262 can be a magnet, for example. In such implementations, if proximity element 262 is not within a detection range of proximity sensor 260, controller 164 does not control inlet valve 228 to the open position at (306). On the other hand, if proximity element 262 is within the detection range of proximity sensor 260, controller 164 does indeed control inlet valve 228 to the open position. Advantageously, in such implementations, it is ensured that container 202 is positioned or docked below cold brewed coffee system 200 prior to controlling inlet valve 228 to the open position. Accordingly, cold brewed coffee produced by cold brewed coffee system 200 is prevented from dripping from outlet 224 into fresh food chamber 122 of refrigerator appliance 100 (FIG. 1).

In some further implementations of method (300), controller 164 may receive signals from proximity sensor 260 indicating whether container 202 is positioned or docked with cold brewed coffee system 200 after inlet valve 228 is opened. In such implementations, if controller 164 receives a signal indicating that container 202 is not present or docked with cold brewed coffee system 200, controller 164 may control inlet valve 228 to move to the closed position so that water is prevented from flowing from water supply 204 to water reservoir 212. Controller 164 may receive signals from proximity sensor 260 continuously while inlet valve 228 is in the open position or may receive signals from proximity sensor 260 at predetermined intervals, e.g., to reduce the processing tasks of controller 164.

At (308), the method (300) includes controlling the inlet valve to the closed position when the water level of the water within the water reservoir has reached a predetermined water level, e.g., so that water is prevented from flowing from the water supply to the water reservoir. For instance, as shown in FIG. 6, when inlet valve 228 is moved to the open position at (306), water fills into water reservoir 212. Water fills into water reservoir 212 at a faster rate than water drips into coffee reservoir 214 via drip passage 216. As water continues to flow into water reservoir 212, float 234 moves vertically upward along the vertical direction along with the water line.

Figure 7:
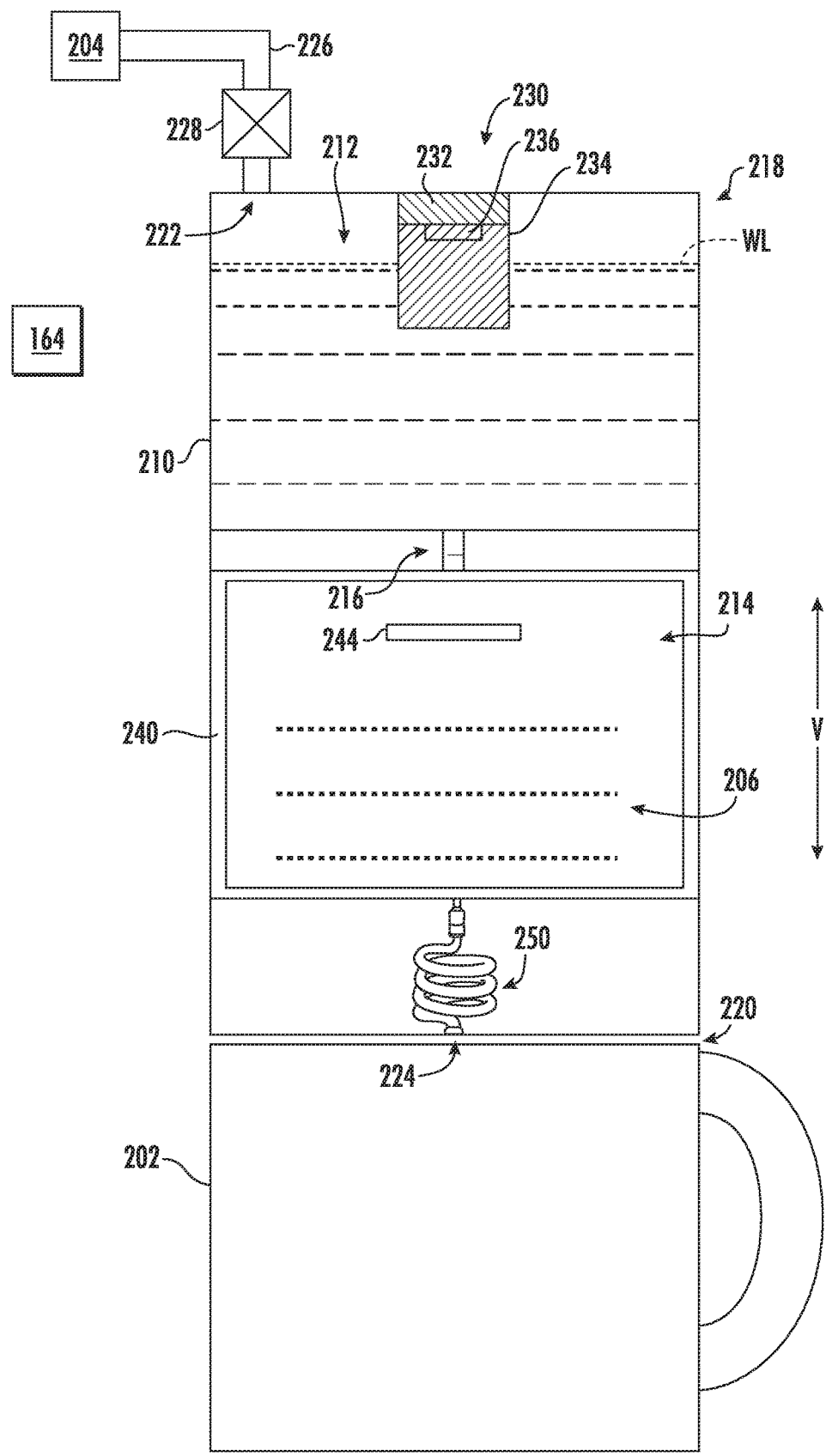

Eventually, as shown in FIG. 7, the water line reaches a predetermined water level WL. When the water within water reservoir 212 reaches the predetermined water level WL, magnet 236 of float 234 activates reed switch 232. When magnet 236 activates reed switch 232, one or more signals are routed to controller 164 indicating that the water level within water reservoir 212 has reached the predetermined water level WL. Controller 164 receives the one or more signals and controls inlet valve 228 to the closed position. For example, controller 164 may send one or more deactivation signals to inlet valve 228 so that inlet valve 228 moves to the closed position. When inlet valve is moved to the closed position, as noted above, water is prevented from flowing from water supply 204 to water reservoir 212. Notably, the water that flows into water reservoir 212 is cooled or maintained at a chilled temperature. In this way, chilled water may be used to steep the coffee grounds within coffee reservoir 214 as will be explained more fully below. Further, in some implementations, the water is prevented from flowing into water reservoir 212 until a user provides another user input to commence the cold brewing process.

In alternative exemplary implementations of method (300), water level sensor 238 (FIG. 3) communicatively coupled with controller 164 may send one or more signals to controller 164 indicating that the water level within water reservoir 212 has reached the predetermined water level WL. In such implementations, water level sensing system 230 need not include float 234 or reed switch 232.

Figure 8:
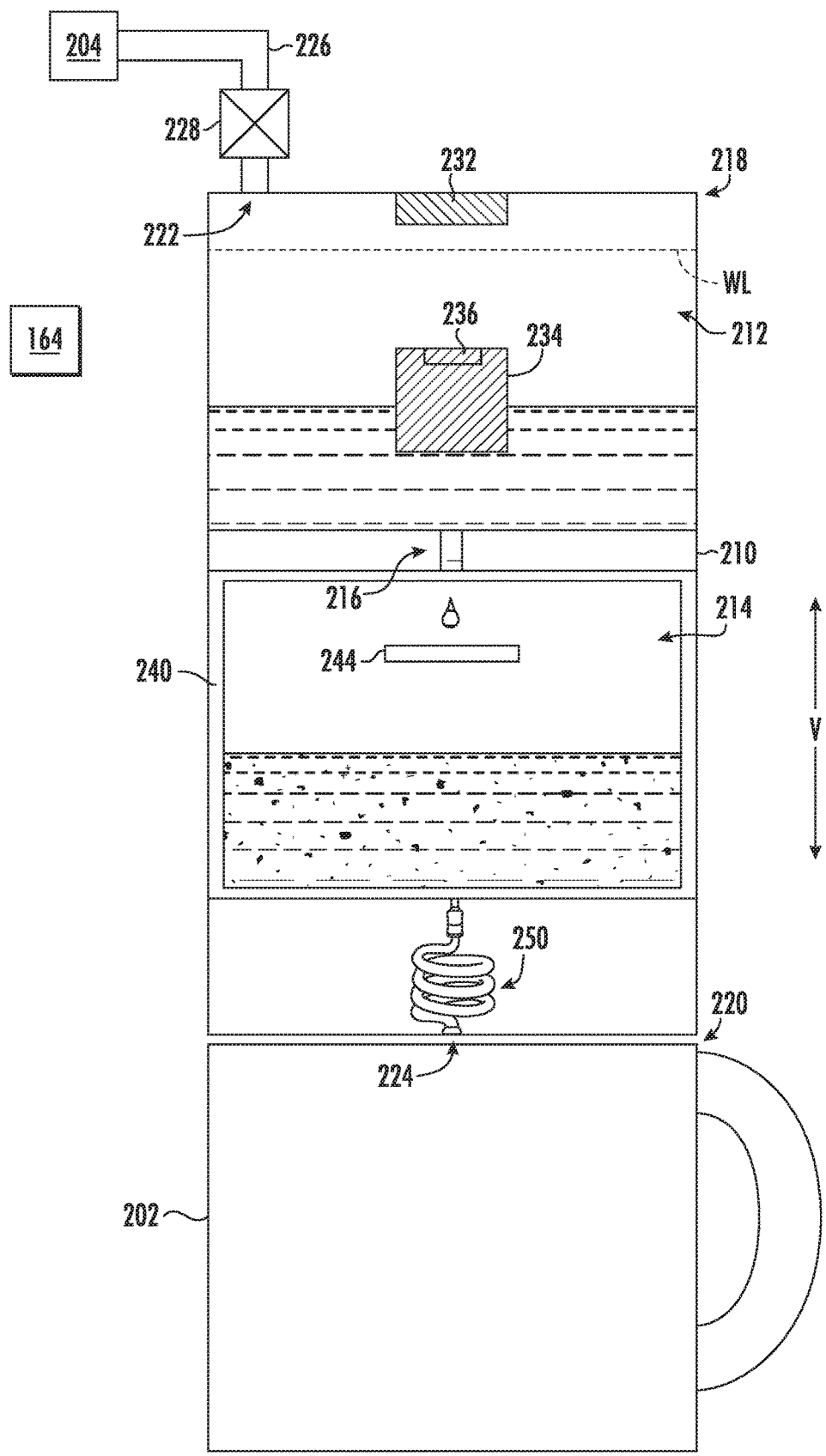

At (310), the method (300) includes providing water from the water reservoir to the coffee reservoir so that water mixes with the coffee grounds of the coffee materials. For instance, as shown in FIG. 8, water may slowly drip from water reservoir 212 into coffee reservoir 214 via drip passage 216. When water is mixed with the coffee grounds of the coffee materials 206 (FIG. 7), the coffee grounds steep in the water and flavor from the coffee grounds is extracted. As water within water reservoir 212 slowly drips into coffee reservoir 214 via drip passage 216, the water level decreases and thus float 234 is move downward along the vertical direction with the receding water line as shown in FIG. 8.

Figure 9:
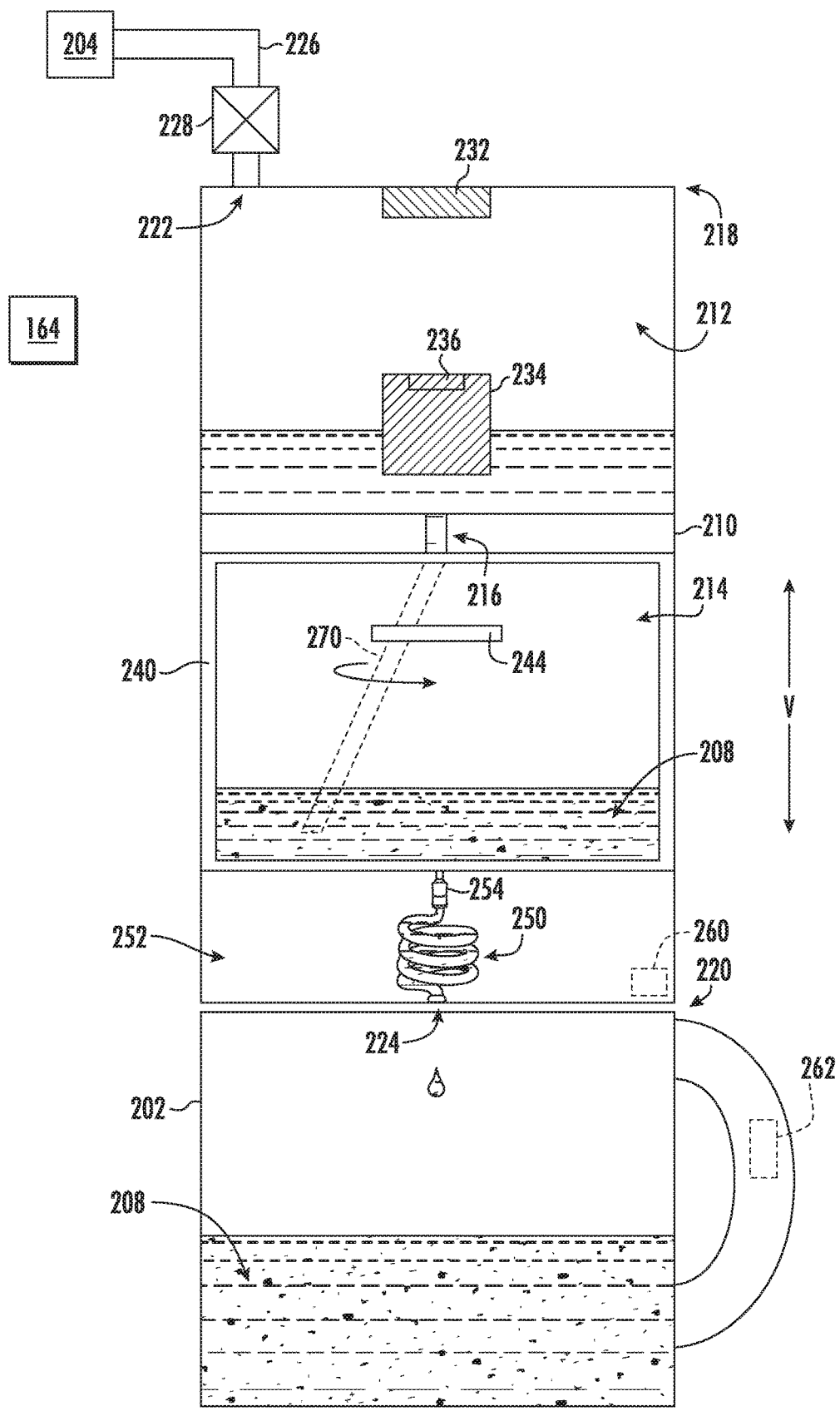
Figure 10:
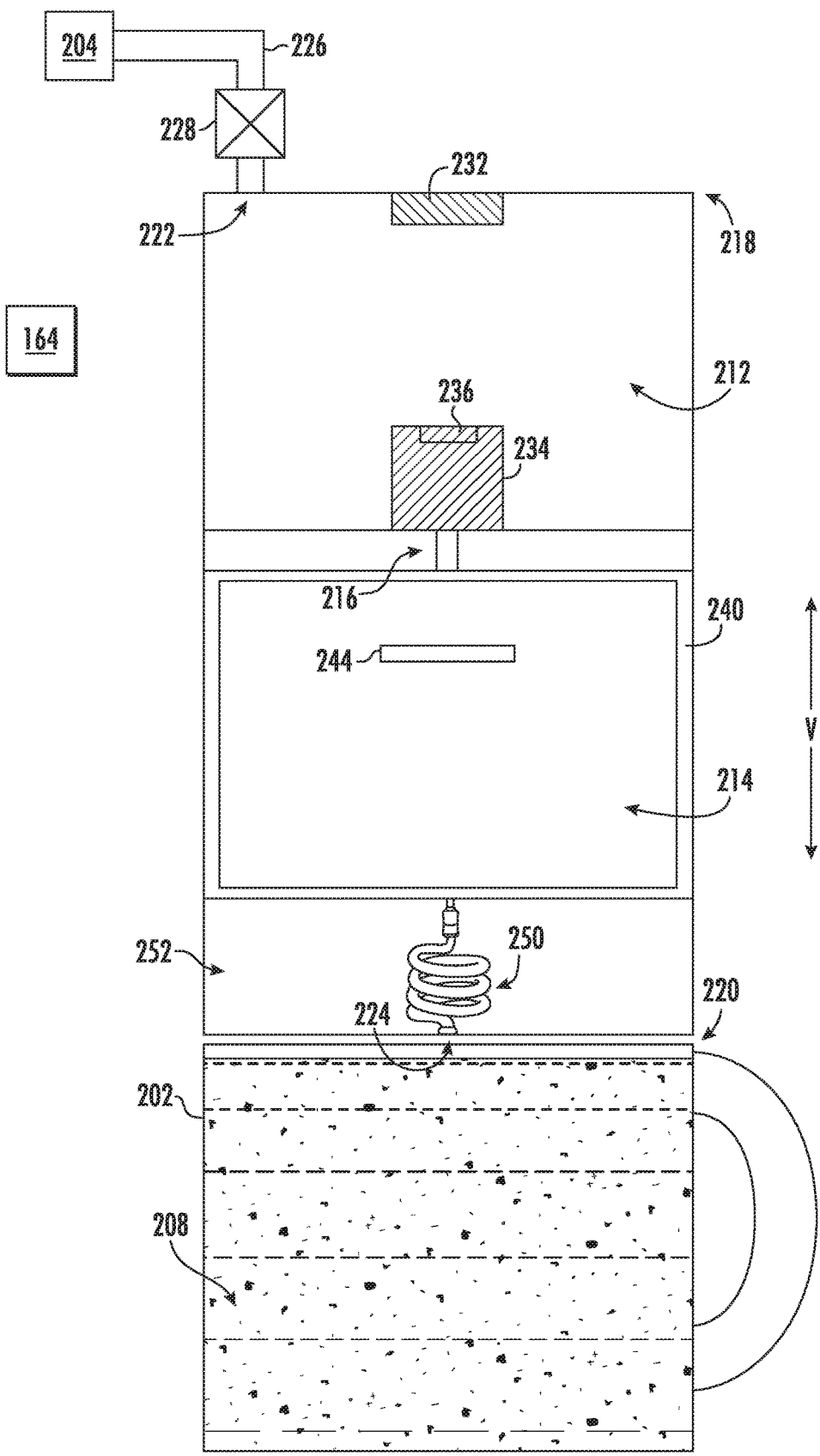

At (312), the method (300) includes providing, by a slow drip, cold brewed coffee from the coffee reservoir to the coffee container. For instance, after steeping for a predetermined time, cold brewed coffee 208 slowly drips from coffee reservoir 214 into coffee container 202 via slow drip passage 250 as shown in FIG. 9. Particularly, cold brewed coffee 208 flows from coffee reservoir 214 downstream through slow drip passage 250 and exits housing 210 of cold brewed coffee system 200 through outlet 224. The cold brewed coffee 208 slowly drips into coffee container 202. Eventually, as shown in FIG. 10, all of the cold brewed coffee 208 fills into coffee container 202. Notably, as the cold brewed coffee 208 in coffee container 202 has been maintained within fresh food chamber 122 of refrigerator appliance 100 (FIG. 1), a user may readily access chilled cold brewed coffee 208 contained in coffee container 202. Advantageously, a user need not transport the cold brewed coffee 208 into refrigerator appliance 100 as it is already located therein. Particularly, there is no need to transport the cold brewed coffee 208 from e.g., a kitchen counter into refrigerator appliance 100 to chill the cold brewed coffee 208 prior to consumption.

With reference to FIG. 9, in some implementations, during steeping, or as water is provided from water reservoir 212 to coffee reservoir 214 at (310) or as cold brewed coffee 208 is provided from coffee reservoir 214 to coffee container 202 at (312), a stirring device 270 rotatably coupled with housing 210 may stir the steeping water/coffee grounds mixture or cold brewed coffee 208 within coffee reservoir 214. In this way, optimal extraction of the flavor from the coffee grounds may be achieved. In some implementations, stirring device 270 is movable about an axis of rotation and may be driven by an electric drive (not shown), e.g., a motor. The electric drive may be positioned between water reservoir 212 and coffee reservoir 214 within housing 210. The electric drive may be communicatively coupled with controller 164 and may be activated to stir the contents within coffee reservoir 214 at a predetermined interval or upon user command, e.g., by a user input to one of input selectors 162 (FIG. 2).

In yet other exemplary implementations, with further reference to FIG. 9, cold brewed coffee system 200 includes an outlet valve 254 positioned along slow drip passage 250. Outlet valve 254 is configured for selectively allowing cold brewed coffee 208 to flow from coffee reservoir 214 to coffee container 202 via slow drip passage 250. Outlet valve 254 is movable between an open position and a closed position. When outlet valve 254 is in the open position, cold brewed coffee 208 may flow from coffee reservoir 214 to coffee container 202 via slow drip passage 250. In the closed position, cold brewed coffee 208 is prevented from flowing from coffee reservoir 214 to coffee container 202. Controller 164 is communicatively coupled with outlet valve 254 and may thus control outlet valve 254. In some implementations, however, outlet valve 254 may be a manual valve.

Further, in such implementations, cold brewed coffee system 200 also includes proximity sensor 260 embedded with, attached, or connected to housing 210 and coffee container 202 includes proximity element 262. In such implementations, during steeping, or as water is provided from water reservoir 212 to coffee reservoir 214 at (310) or as cold brewed coffee 208 is provided from coffee reservoir 214 to coffee container 202 at (312), controller 164 may control outlet valve 254 to the open or closed position depending on whether proximity element 262 is within the detection range of proximity sensor 260 (e.g., within three (3) inches). For instance, if proximity element 262 is not within the detection range of proximity sensor 260, controller 164 controls outlet valve 254 to the closed position or takes no action if outlet valve 254 is a normally closed valve. If, however, proximity element 262 is within the detection range of proximity sensor 260, controller 164 controls inlet valve 228 to the open position or takes no action if outlet valve is a normally open valve. Controller 164 may receive signals from proximity sensor 260 indicating whether proximity element 262 is within the detection range of proximity sensor 260 (i.e., whether container 202 is positioned or docked with cold brewed coffee system 200, e.g., during (310) and (312)). Controller 164 may receive signals from proximity sensor 260 continuously during (310) and (312) or at predetermined intervals, e.g., to reduce the processing tasks of controller 164. Advantageously, in such implementations, it is ensured that container 202 is positioned or docked below cold brewed coffee system 200 as cold brewed coffee 208 slowly drips from coffee reservoir 214 via slow drip passage 250. Accordingly, cold brewed coffee 208 produced by cold brewed coffee system 200 is prevented from dripping from outlet 224 into fresh food chamber 122 of refrigerator appliance 100 (FIG. 1).

Figure 11:
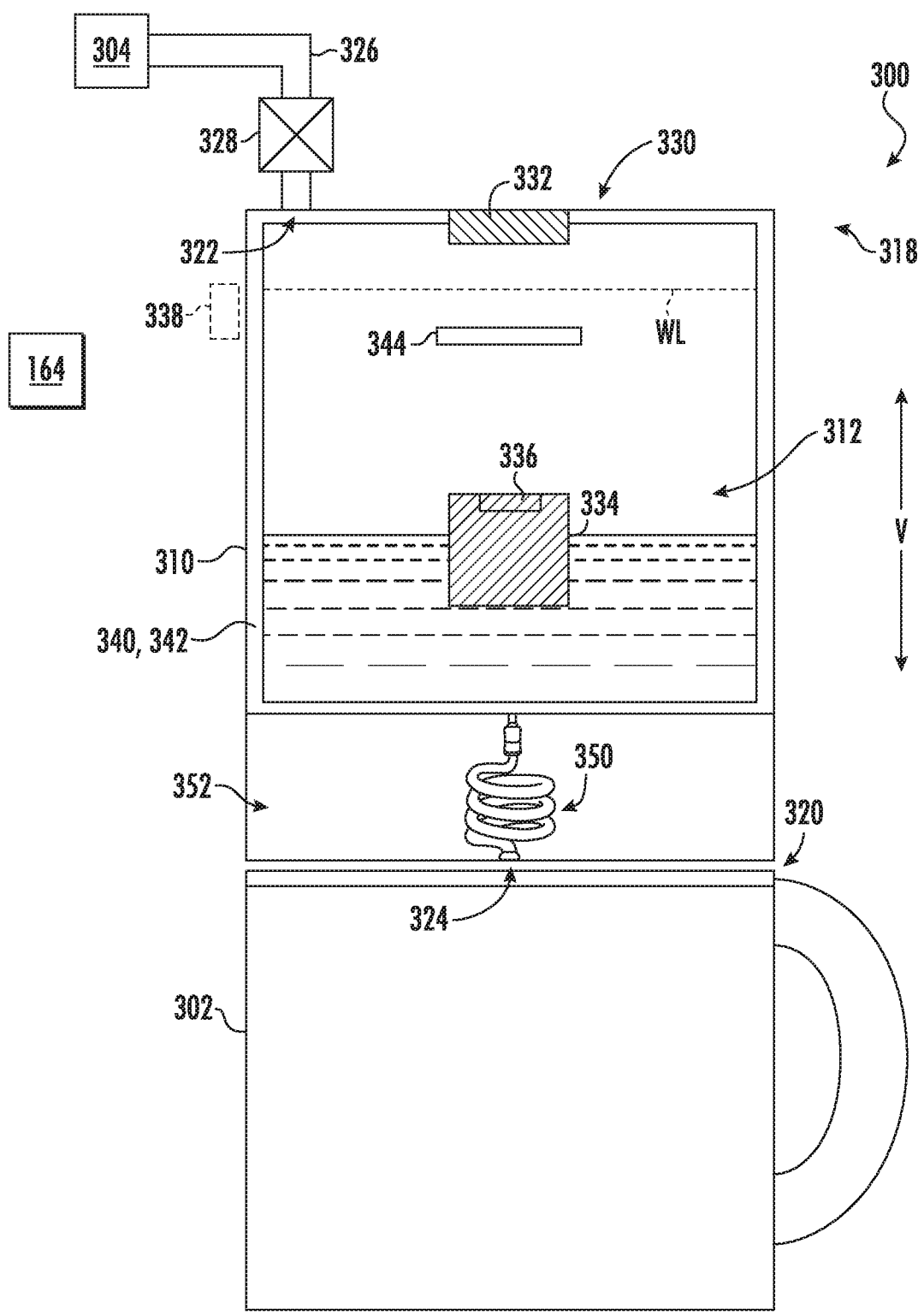
FIG. 11 provides a schematic view of another exemplary cold brewed coffee system according to an exemplary embodiment of the present subject matter.

FIG. 11 provides a schematic view of another exemplary cold brewed coffee system 300 that may be positioned within a chilled chamber of a refrigerator appliance according to an exemplary embodiment of the present subject matter. For instance, the cold brewed coffee system 300 of FIG. 11 may be positioned within the fresh food chamber 122 of refrigerator appliance 100 of FIGS. 1 and 2, for example. Generally, the cold brewed coffee system 300 of FIG. 11 is configured in a similar manner as the cold brewed coffee system 200 of FIGS. 3 through 10. The differences between the embodiments will be described below.

As shown in FIG. 11, cold brewed coffee system 300 includes a housing 310. Housing 310 defines a reservoir 312. In contrast to the cold brewed coffee system 200 of FIGS. 3 through 10, the housing 310 of cold brewed coffee system 300 defines only a single reservoir. Generally, reservoir 312 is configured to receive coffee materials (e.g., coffee grounds and a filter) and water, e.g., for cold brewing the coffee grounds. Housing 310 of cold brewed coffee system 300 extends between a top end 318 and a bottom end 320, e.g., along the vertical direction V. For this embodiment, housing 310 defines an inlet 322 at top end 318 and an outlet 324 at bottom end 320. Cold brewed coffee system 300 includes an inlet supply conduit 326 that fluidly connects a water supply 304 with reservoir 312. More particularly, inlet supply conduit 326 fluidly connects water supply 304 with inlet 322 of housing 310 so that water may flow from water supply 304 to reservoir 312. An inlet valve 328 is positioned along inlet supply conduit 326. Inlet valve 328 is movable between an open position and a closed position. Thus, inlet valve 328 is configured for selectively allowing water to flow from water supply 304 to reservoir 312. In the open position, inlet valve 328 allows water to flow from water supply 304 to reservoir 312. In the closed position, inlet valve 328 prevents water from flowing from water supply 304 to reservoir 312.

In some embodiments, inlet valve 328 is a normally closed solenoid valve. Controller 164 or another processing device dedicated to cold brewed coffee system 300 is communicatively coupled with inlet valve 328. For instance, upon initiation of a cold brewing process by a user input, e.g., to one of input selectors 162 (FIG. 2), controller 164 may control inlet valve 328 to move to the open position so that water may flow from water supply 304 to reservoir 312. For instance, controller 164 may send an activation signal to energize inlet valve 328 so that inlet valve 328 moves to the open position. When water within reservoir 312 has reached a predetermined water level (e.g., as determined by a water level sensing system), controller 164 may control inlet valve 328 to move to the closed position.

Cold brewed coffee system 300 also includes a water level sensing system 330 operable to detect when water within the water reservoir has reached a predetermined water level, denoted by WL in FIG. 11. For the depicted embodiment of FIG. 11, water level sensing system 330 includes a float 334 and a reed switch 332. Float 334 is buoyant and is configured to float to the surface of the water within reservoir 312. Float 334 may be attached or connected to a track (not shown) so that float 334 moves generally up and down with the water line along the vertical direction V. A magnet 336 is attached to or embedded within float 334. Reed switch 332 is attached or connected to a top wall of housing 310 at top end 318 and is positioned within reservoir 312. In some embodiments, reed switch 332 is positioned outside of or above reservoir 312. Reed switch 332 is communicatively coupled with inlet valve 328. In some embodiments, reed switch 332 is directly communicatively coupled with inlet valve 328 (e.g., via a wired or wireless connection). For this embodiment, reed switch 332 is communicatively coupled with inlet valve 328 via controller 164 and one or more wired or wireless connections. When the water level within reservoir 312 reaches the predetermined water level WL, float 334 floats to the top of reservoir 312 and activates reed switch 332. That is, when float 334 is positioned at or proximate reed switch 332, magnet 336 of float 334 activates reed switch 332. When reed switch 332 is activated, a signal indicating that the water level within reservoir 312 has reached the predetermined water level WL is sent to controller 164 and controller 164 receives and processes the signal. Thereafter, controller 164 may control inlet valve 328 to the closed position, e.g., to shut off the flow of water from water supply 304 to reservoir 312. Thus, when float 334 is positioned at or proximate reed switch 332, magnet 336 of float 334 activates reed switch 332 causing inlet valve 328 to move to the closed position. In some embodiments, as noted above, reed switch 332 is directly communicatively coupled with inlet valve 328 and thus one or more signals may be routed directly to inlet valve 328.

In some alternative embodiments, water level sensing system 330 includes a water level sensor 338 (shown in phantom in FIG. 11). In such embodiments, water level sensor 338 is configured to detect the water level of the water within reservoir 312. For instance, water level sensor 338 may be mounted to housing 310 such that water level sensor 338 may detect when the water within reservoir 312 has reached the predetermined water level WL. Water level sensor 338 may be any suitable type of sensor capable of sensing the water level of the water within reservoir 312. As one example, water level sensor 338 may be an infrared sensor. Water level sensor 338 is communicatively coupled with controller 164, e.g., so that one or more signals may be routed therebetween. In some embodiments, water level sensor 338 is directly communicatively coupled with inlet valve 328 (e.g., via a wired or wireless connection).

As further depicted in FIG. 11, housing 310 of cold brewed coffee system 300 has an access panel 340 that provides selective access to reservoir 312. For instance, access panel 340 may be rotatably coupled or hinged with housing 310 and may be movable between an open position and a closed position. Access panel 340 may be rotated to the open position so that coffee materials (e.g., coffee grounds and a filter) are loadable into reservoir 312. Access panel 340 may include a handle 344 to facilitate movement of access panel 340 between the open and closed positions. Once the coffee grounds and filter are loaded, the user may rotate access panel 340 to the closed position and sealed. In some embodiments, access panel 340 extends the full vertical length of reservoir 312 as shown in FIG. 11. In other embodiments, access panel 340 need not extend the full vertical length of reservoir 312. For instance, access panel 340 may extend half the vertical length of reservoir 312.

In some alternative embodiments, housing 310 has a bin 342 movable between a withdrawn position and a retracted position. Bin 342 may include handle 344 that may be utilized by a user to move bin 342 between the withdrawn position in which coffee materials (e.g., coffee grounds and a filter) are loadable into bin 342 and the retracted position in which bin 342 is housed within housing 310, e.g., during operation of cold brewed coffee system 300. In such embodiments, bin 342 and housing 310 define reservoir 312.

A slow drip passage 350 fluidly connects reservoir 312 with outlet 324 of housing 310. Slow drip passage 350 is positioned generally below reservoir 312 along the vertical direction V. For this embodiment, slow drip passage 350 is positioned within a slow drip chamber 352 defined by housing 310 vertically below reservoir 312. Slow drip passage 350 facilitates a slow drip of the coffee produced in reservoir 312 into coffee container 302. For the embodiment depicted in FIG. 11, slow drip passage 350 is a spiral coil. However, in other exemplary embodiments, slow drip passage 350 may have other suitable geometries that facilitate the slow drip of coffee from reservoir 312 into coffee container 302 docked below cold brewed coffee system 300. Notably, as cold brewed coffee system 300 is positioned within fresh food chamber 122 of refrigerator appliance 100 (FIG. 2), the produced coffee that has dripped into container 302 is maintained at a chilled temperature and is thus instantly ready for consumer consumption at the chilled temperature. It will be appreciated that cold brewed coffee system 300 may include features described an illustrated with respect to cold brewed coffee system 200, such as, e.g., a proximity sensor and associated proximity element, a stirring device, an outlet valve, etc.

The cold brewed coffee systems 200, 300 described herein provide a number of benefits and advantages. For instance, coffee grounds may be steeped with chilled water as opposed to room temperature water. The temperature of the water mixed with the coffee grounds may be maintained as the cold brewed coffee system 200 is positioned within a chilled chamber of a refrigerator appliance. Further, after the brewed coffee has dripped into the coffee container, there is no need to move the coffee container to a chilled chamber to chill the brewed coffee to the desired temperature. As noted above, this is because the cold brewed coffee systems 200, 300 are positioned within a chilled chamber. Additionally, as cold brewed coffee systems 200, 300 are integrated into a refrigerator appliance, there is no need for a consumer to purchase a dedicated cold brewed coffee system. Accordingly, valuable countertop or storage space may be utilized for other objects. The cold brewed coffee systems 200, 300 described herein may have other advantages and benefits not explicitly listed herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance, comprising:
   a cabinet defining a chilled chamber;
   a cold brewed coffee system positioned within the chilled chamber, the cold brewed coffee system comprising:
      a housing defining a water reservoir and a coffee reservoir in fluid communication with the water reservoir, the coffee reservoir configured to receive coffee materials for mixing with water flowing downstream from the water reservoir to produce cold brewed coffee, and wherein the housing further defines an outlet through which cold brewed coffee is dispensed from the cold brewed coffee system, the outlet being positioned within the chilled chamber;
      a water level sensing system operable to detect when water within the water reservoir has reached a predetermined water level;
      an inlet supply conduit fluidly connecting a water supply with the water reservoir; and
      an inlet valve positioned along the inlet supply conduit and movable between an open position and a closed position, the inlet valve configured for selectively allowing water to flow from the water supply to the water reservoir;
      a proximity sensor mounted within or to the housing, the proximity sensor defining a detection range;
      a coffee container having a proximity element;
      a controller communicatively coupled with the proximity sensor;
      a slow drip passage fluidly connecting the coffee reservoir and the outlet defined by the housing; and
      an outlet valve positioned along the slow drip passage, the outlet valve movable between an open position and a closed position, and
      wherein when the proximity element is not within the detection range of the proximity sensor, the controller is further configured to:
         control the outlet valve to move to the closed position.

2. The refrigerator appliance of claim 1, wherein the refrigerator appliance defines a vertical direction, and wherein the coffee reservoir is positioned below the water reservoir along the vertical direction.

3. The refrigerator appliance of claim 1, wherein the refrigerator appliance has a shelf disposed within the chilled chamber, and wherein the housing of the cold brewed coffee system is mounted to the shelf.

4. The refrigerator appliance of claim 1, wherein the cold brewed coffee system has a slow drip passage fluidly connecting the coffee reservoir and the outlet defined by the housing.

5. The refrigerator appliance of claim 4, wherein the slow drip passage is a spiral coil.

6. The refrigerator appliance of claim 1, wherein the water level sensing system comprises:
   a float positioned within the water reservoir and having a magnet; and
   a reed switch positioned within the water reservoir and attached to the housing, wherein the reed switch is communicatively coupled with the inlet valve, and
   wherein when the float is positioned at or proximate the reed switch, the magnet of the float activates the reed switch causing the inlet valve to move to the closed position.

7. The refrigerator appliance of claim 1, wherein the water level sensing system comprises:
   a water level sensor attached to the housing and operable to detect a water level of water within the water reservoir, wherein the water level sensor is communicatively coupled with the inlet valve, and
   wherein when the water level sensor detects water within the water reservoir at a predetermined water level, the inlet valve is moved to the closed position.

8. The refrigerator appliance of claim 1, wherein the housing has a bin movable between a withdrawn position in which the coffee materials are loadable into the bin and a retracted position, wherein the bin at least partially defines the coffee reservoir.

9. The refrigerator appliance of claim 1, wherein the housing has an access panel rotatably coupled thereto and movable between an open position in which the coffee materials are loadable into the coffee reservoir and a closed position.

10. The refrigerator appliance of claim 1, wherein the controller is communicatively coupled with the inlet valve, and wherein the controller is configured to:
   receive one or more signals indicating that a user input has been provided to commence a cold brewing process utilizing the cold brewed coffee system;
   control the inlet valve to move to the open position so that water flows flow from the water supply to the water reservoir;
   receive, from the water level sensing system, one or more signals indicating whether water within the water reservoir has reached a predetermined water level; and
   control the inlet valve to move to the closed position when water within the water reservoir has reached the predetermined water level.

11. The refrigerator appliance of claim 10, wherein the controller is further configured to:
   receive, from the proximity sensor, one or more signals indicating whether the proximity element of the coffee container is within the detection range of the proximity sensor.

12. The refrigerator appliance of claim 11, wherein when the proximity element is not within the detection range of the proximity sensor, the controller does not control the inlet valve to move to the open position so that water flows flow from the water supply to the water reservoir.

13. A refrigerator appliance defining a vertical direction, the refrigerator appliance comprising:
   a cabinet defining a fresh food chamber;
   a cold brewed coffee system positioned within the fresh food chamber, the cold brewed coffee system comprising:
      a housing defining a water reservoir and a coffee reservoir positioned below the water reservoir along the vertical direction, the water reservoir in fluid communication with the water reservoir via a drip passage defined by the housing, the coffee reservoir configured to receive coffee materials, and wherein the housing extends between a top end and a bottom end along the vertical direction, and wherein the housing defines an outlet at the bottom end, the outlet being positioned within the fresh food chamber;
      a water level sensing system operable to detect when water within the water reservoir has reached a predetermined water level;
      an inlet supply conduit fluidly connecting a water supply with the water reservoir;
      an inlet valve positioned along the inlet supply conduit and movable between an open position and a closed position, the inlet valve configured for selectively allowing water to flow from the water supply to the water reservoir;
      a slow drip passage fluidly connecting the coffee reservoir and the outlet defined by the housing;
      an outlet valve positioned along the slow drip passage, the outlet valve movable between an open position and a closed position, and
      a proximity sensor mounted within or to the housing, the proximity sensor defining a detection range;
      a coffee container having a proximity element; and
      a controller communicatively coupled with the water level sensing system and the proximity sensor, the controller configured to:
         receive one or more signals indicating that a user input has been provided to commence a cold brewing process utilizing the cold brewed coffee system;
         control the inlet valve to move to the open position so that water flows flow from the water supply to the water reservoir;
         receive, from the water level sensing system, one or more signals indicating whether water within the water reservoir has reached a predetermined water level; and
         control the inlet valve to move to the closed position when water within the water reservoir has reached the predetermined water level, and
      wherein water flows from the water reservoir to the coffee reservoir through the drip passage and mixes with the coffee materials to produce cold brewed coffee, the cold brewed coffee being dispensed from the cold brewed coffee system through the outlet, and
      wherein when the proximity element is not within the detection range of the proximity sensor, the controller is further configured to control the outlet valve to move to the closed position.

14. The refrigerator appliance of claim 13, wherein the refrigerator appliance has a liner defining the fresh food chamber, and wherein the housing of the cold brewed coffee system is mounted to the liner.

15. The refrigerator appliance of claim 13, wherein the cold brewed coffee system further comprises:
   a stirring device rotatably coupled with the housing and positioned within the coffee reservoir, the stirring device configured to stir contents within the coffee reservoir.

16. The refrigerator appliance of claim 13, wherein the controller is further configured to:
   receive, from the proximity sensor, one or more signals indicating whether the proximity element of the coffee container is within the detection range of the proximity sensor.

17. A refrigerator appliance, comprising:
   a cabinet defining a chilled chamber;
   a cold brewed coffee system positioned within the chilled chamber, the cold brewed coffee system comprising:
      a housing defining a reservoir and an outlet, the reservoir configured to receive coffee materials for mixing with water to produce cold brewed coffee, wherein cold brewed coffee is dispensed from the cold brewed coffee system through the outlet, the outlet being positioned within the chilled chamber;
      a water level sensing system operable to detect when water within the reservoir has reached a predetermined water level;
      an inlet supply conduit fluidly connecting a water supply with the reservoir; and
      an inlet valve positioned along the inlet supply conduit and movable between an open position and a closed position, the inlet valve configured for selectively allowing water to flow from the water supply to the reservoir
      a proximity sensor mounted within or to the housing, the proximity sensor defining a detection range;
      a coffee container having a proximity element;

a controller communicatively coupled with the proximity sensor;

a slow drip passage fluidly connecting the coffee reservoir and the outlet defined by the housing; and an outlet valve positioned along the slow drip passage, the outlet valve movable between an open position and a closed position, and wherein when the proximity element is not within the detection range of the proximity sensor, the controller is further configured to:

control the outlet valve to move to the closed position.

* * * * *